United States Patent
McGarry et al.

(10) Patent No.: US 12,123,806 B2
(45) Date of Patent: Oct. 22, 2024

(54) LEAK DETECTION AND CONTAINMENT MUFFLER SYSTEM

(71) Applicant: PSG CALIFORNIA LLC, Grand Terrace, CA (US)

(72) Inventors: Paul McGarry, Mentor, OH (US); Daniel McDermott, Mentor, OH (US)

(73) Assignee: PSG CALIFORNIA LLC, Grand Terrace, CA (US)

( * ) Notice: Subject to any disclaimer, the term of this patent is extended or adjusted under 35 U.S.C. 154(b) by 453 days.

(21) Appl. No.: 17/422,151

(22) PCT Filed: Jan. 10, 2020

(86) PCT No.: PCT/US2020/013157
§ 371 (c)(1),
(2) Date: Jul. 9, 2021

(87) PCT Pub. No.: WO2020/146778
PCT Pub. Date: Jul. 16, 2020

(65) Prior Publication Data
US 2022/0113213 A1    Apr. 14, 2022

Related U.S. Application Data

(60) Provisional application No. 62/790,545, filed on Jan. 10, 2019.

(51) Int. Cl.
*G01M 3/16* (2006.01)
*F04B 43/06* (2006.01)
(Continued)

(52) U.S. Cl.
CPC ............ *G01M 3/16* (2013.01); *F04B 43/06* (2013.01); *F04B 51/00* (2013.01); *F04B 53/004* (2013.01)

(58) Field of Classification Search
None
See application file for complete search history.

(56) References Cited

U.S. PATENT DOCUMENTS 4,621,990 A * 11/1986 Forsythe ............... F04B 43/067
417/395
4,791,805 A * 12/1988 Gates .................... G01M 3/229
73/40.7

(Continued)

FOREIGN PATENT DOCUMENTS

CN    201437770    4/2010
CN    103147971    6/2013
(Continued)

OTHER PUBLICATIONS

[No Author Listed], "Air Operated Double Diaphragm Pumps," Dellmeco LTD, Aug. 2009, 21 pages.
(Continued)

*Primary Examiner* — Alexander A Mercado
(74) *Attorney, Agent, or Firm* — Fish & Richardson P.C.

(57) ABSTRACT

An air-operated pump, such as an air-operated diaphragm pump, includes a pump body, a process liquid pathway defined at least in part by the pump body, and an air pathway defined at least in part by the pump body, where the process liquid pathway and air pathway are fluidly separated from one another within the pump body. The pump further includes a leak detection and containment assembly integrated with the pump body and having a process liquid sensor configured to sense process liquid leaked from the process liquid pathway into the air pathway, and a shutoff valve communicatively coupled to the process liquid sensor and configured to close in response to the process liquid sensor sensing a process liquid leak to contain the leaked process liquid within the pump body and the assembly.

20 Claims, 9 Drawing Sheets

(51) Int. Cl.
F04B 51/00 (2006.01)
F04B 53/00 (2006.01)

(56) References Cited

U.S. PATENT DOCUMENTS

| | | | |
|---|---|---|---|
| 4,856,969 A | | 8/1989 | Forsythe et al. |
| 4,901,751 A | * | 2/1990 | Story ................... G01M 3/184 |
| | | | 73/40 |
| 4,981,418 A | | 1/1991 | Kingsford et al. |
| 5,232,352 A | | 8/1993 | Robinson |
| 5,332,372 A | | 7/1994 | Reynolds |
| 5,501,577 A | | 3/1996 | Cornell et al. |
| 6,190,136 B1 | | 2/2001 | Meloche et al. |
| 2020/0318628 A1 | * | 10/2020 | Pilcher ................... G01M 3/186 |
| 2021/0199103 A1 | * | 7/2021 | Solfelt ................ F16K 37/0083 |

FOREIGN PATENT DOCUMENTS

| | | |
|---|---|---|
| CN | 103154517 A | 6/2013 |
| CN | 108661891 A | 10/2018 |
| DE | 10322221 B3 | 1/2005 |
| JP | H01148319 A | 6/1989 |
| JP | H03185282 A | 8/1991 |
| JP | 2000130334 A | 5/2000 |

OTHER PUBLICATIONS

[No Author Listed], "Exploded view and parts list for 73000-00," The All-Flo Pump Company, LLC, dated Apr. 26, 2018, 3 pages.

absolutewaterpumps.com [online], "Air-Operated Double Diaphragm Pumps," Jul. 2019, retrieved on Mar. 10, 2022, retrieved from URL<https://www.absolutewaterpumps.com/media/blfa_files/All-Flo_Diaphragm_Full_Product_Line_2019_-_Brochure.pdf>, 6 pages.

Andersonprocess.com [Online], "SpillStop™ Leak Containment System—Installation and Operation Manual," upon information and belief, available no later than Nov. 26, 2018, retrieved on Mar. 8, 2022, retrieved from URL<https://shop.andersonprocess.com/media/assets/product/documents/blacoh-spillstop-installation-operation-manual.pdf>, 8 pages.

Eta.gr [Online], "Plastic optical level sensors with unmodulated infrared light for non-conductive liquids. Carlo Gavazzi," May 6, 2017, retrieved on Mar. 8, 2022, retrieved from URL<https://eta.gr/en/catalog/product/plastika-optika-ais8hthria-me-adiamorfwto-ypery8ro-fws-gia-epithrhsh-sta8mhs-mh-agwgimwn-ygrwn/>, 2 pages.

Extended European Search Report in European Appln. No. 20738543.6, dated Dec. 15, 2021, 7 pages.

Flowline.com [Online], "Switch-Tek™ LO10 Optic Liquid Leak Detection Switch," May 6, 2017, retrieved on Mar. 8, 2022, retrieved from URL<https://www.flowline.com/product/switch-tek-lo10-optic-liquid-leak-detection-switch/>, 1 page.

International Preliminary Report on Patentability in International Appln. No. PCT/US2020/013157, dated Jul. 22, 2021, 8 pages.

International Search Report and Written Opinion in International Appln. No. PCT/US2020/013157, dated Mar. 10, 2020, 9 pages.

Psgdover.com.cn [Online], "All-safe leak detection & containment system," available on or before Oct. 22, 2021, retrieved on Mar. 8, 2022, retrieved from URL<https://psgdover.com.cn/docs/default-source/all-flo-docs/brochures/all-flo-all-safe-leak-detection-and-containment-system-brochure.pdf?sfvrsn=4ec6b537_11>, 6 pages.

Tapflo.com [Online], "Tapflo—Systems and Accessories for Pumps," upon information and belief, available no later than Oct. 29, 2020, retrieved on Mar. 8, 2022, retrieved from URL<https://www.tapflo.com/en/images/brochures/Tapflo_Accessories_overview_web.pdf>, 12 pages.

vm.salesmrc.com [online], "Versa-Sense™ II Electronic Leak Detector—Service & Operating Manual," Apr. 2019, retrieved on Mar. 8, 2022, retrieved from URL<https://vm.salesmrc.com/pdfs/vs2sm.pdf>, 4 pages.

International Search Report/Written Opinion issued by the United States Receiving Office dated Jan. 10, 2020, 9 pages.

Extended European Serch Report in European Appln. No. 23207066.4, mailed on Jan. 19, 2024, 6 pages.

* cited by examiner

LEAK DETECTION AND CONTAINMENT MUFFLER SYSTEM

FIELD OF INVENTION

The present invention relates generally to a leak detection system for a liquid pump, and more particularly to a leak detection and containment muffler system for an air-operated pump.

BACKGROUND

Air-operated pumps are used in a multitude of industries for moving materials from paints and stains to tomato and other food pastes.

SUMMARY

According to one aspect of the invention, an air-operated pump system has an air-operated pump and a leak detection and containment assembly. The air-operated pump includes a pump body, and a process liquid pathway defined at least in part by the pump body. An air pathway is defined at least in part by the pump body, wherein the process liquid pathway and air pathway are fluidly separated from one another within the pump body, and wherein air passing along the air pathway causes pumping of the process liquid along the process liquid pathway.

The leak detection and containment assembly are integrated with the pump body. The leak detection and containment assembly includes a process liquid sensor configured to sense process liquid leaked from the process liquid pathway into the air pathway and a shutoff valve communicatively coupled to the process liquid sensor. The shutoff valve is configured to close in response to the process liquid sensor detecting process fluid to contain the leaked process liquid within the pump body and the assembly. The leak detection and containment assembly is disposed along the air pathway and downstream from an air outlet of the pump body. The process liquid sensor is located below a bottom of a main air channel on the air pathway, whereby the process liquid sensor is out of a direct line of exhaust flow on the main air channel of the air pathway.

The process liquid sensor is a static sensor having all fixed components in response to air flow or process liquid moving past the process liquid sensor. Further, the process liquid sensor is located at the lowest point of the air pathway. The leak detection and containment assembly further includes a muffler disposed along the air pathway to abate the noise level of air exhausted from the pump body. The process liquid sensor is spaced along the air pathway from the muffler to reduce impact of muffler icing on the process liquid sensor.

The leak detection and containment assembly defines a linear section of the air pathway of the air-operated pump. The bottom of the main air channel is a lowest point of an inner diameter of the main air channel. A tip of the process liquid sensor is located about two inches below the bottom of the main air channel. The air-operated pump is a diaphragm pump, and the process liquid pathway and the air pathway are separated from one another by at least one movable diaphragm. The controller communicatively couples the shutoff valve and the process liquid sensor. The controller is configured to close the shutoff valve when process liquid is detected at the process liquid sensor.

According to another aspect of the invention, an air-operated diaphragm pump has a pump body with a process liquid inlet, a process liquid outlet, an air inlet and an air outlet. A process liquid pathway is defined, at least in part, by the pump body and extends at least from the process liquid inlet through the process liquid outlet. An air pathway is defined, at least in part, by the pump body and extending at least from the air inlet through the air outlet. One or more diaphragm members are disposed in the pump body and fluidly separating the process liquid pathway from the air pathway in the pump body. The one or more diaphragm members are configured for being driven by a supply of air directed along the air pathway to cause movement of a process liquid along the process liquid pathway.

A leak detection and containment muffler assembly is coupled to the air outlet. The leak detection and containment muffler assembly includes a process liquid sensor downstream of the air outlet along the air pathway. The process liquid sensor detects process liquid having leaked into the air pathway. A shutoff valve is communicatively coupled to the process liquid sensor and configured to be open in the absence of liquid. The shutoff valve closes the air pathway downstream of the air outlet upon detection of a process liquid leak into the air pathway at the process liquid sensor. The assembly includes a muffler for abating the noise level of air exhausted from the air outlet of the diaphragm pump. The process liquid sensor is located below the bottom of a main air channel on the air pathway, whereby the process liquid sensor is out of the direct line of exhaust flow on the main air channel of the air pathway.

The shutoff valve is disposed downstream of process liquid sensor along the air pathway. The process liquid sensor is a static sensor having all fixed components in response to air flow or process liquid moving past the process liquid sensor. The process liquid sensor is spaced upstream along the air pathway from the muffler to reduce impact of muffler icing on the process liquid sensor. The leak detection and containment muffler assembly defines a linear section of air pathway of the air-operated pump.

The air-operated diaphragm pump further includes a controller communicatively connecting the shutoff valve and the process liquid sensor, the controller configured to trigger the shutoff valve upon recognition of material leak by the process liquid sensor. The bottom of the main air channel is a lowest point of an inner diameter of the main air channel, where a tip of the process liquid sensor is located about two inches below the bottom of the main air channel.

According to another aspect of the invention, a leak detection and containment assembly provides an air pathway for exhaust of motive air from an air-operated pump, where the motive air drives movement of a process liquid through the air-operated pump. The leak detection and containment assembly includes a coupling element, a process liquid sensor, a shutoff valve, and a muffler. The coupling element allows for coupling the leak detection and containment assembly to a respective air-operated pump. The process liquid sensor detects the presence of process liquid in the air pathway. The shutoff valve is communicatively coupled to the process liquid sensor and configured to be open in the absence of liquid, closing the air pathway downstream of the process liquid sensor upon detection of the presence of the process liquid at the process liquid sensor. The muffler abates the noise level of air exhausted from the leak detection and containment assembly.

The coupling element is threaded to allow for threaded coupling to a respective air-operated pump. The process liquid sensor is a static sensor having all fixed components in response to air flow moving past the process liquid sensor. The leak detection and containment assembly further includes a controller communicatively coupling the shutoff valve and the process liquid sensor. The controller is configured to trigger the shutoff valve upon detection of the process liquid at the process liquid sensor. The process liquid sensor is located below a bottom of a main air channel on the air pathway. The process liquid sensor is out of a direct line of air exhaust flow on the main air channel of the air pathway. The bottom of the main air channel is a lowest point of an inner diameter of the main air channel. A tip of the process liquid sensor is located about two inches below the bottom of the main air channel. The process liquid sensor is located at the lowest point of the air pathway.

BRIEF DESCRIPTION OF THE DRAWINGS

These and other features of the present invention, and their advantages, are illustrated specifically in embodiments of the invention now to be described, by way of example, with reference to the accompanying diagrammatic drawings, in which:

FIG. 1b is a side view of the pump of FIG. 1a;

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawings and description are to be regarded as illustrative in nature and not as restrictive.

DETAILED DESCRIPTION

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In at least some instances, the approximating language may correspond to the precision of an instrument for measuring the value. Range limitations may be combined and/or interchanged, and such ranges are identified and include all the sub-ranges stated herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

As used herein, the terms "comprises", "comprising", "includes", "including", "has", "having", or any other variation thereof, are intended to cover a non-exclusive inclusion. For example, a process, method, article or apparatus that comprises a list of elements is not necessarily limited to only those elements, but may include other elements not expressly listed or inherent to such process, method, article, or apparatus.

The singular forms "a", "an", and "the" include plural referents unless the context clearly dictates otherwise.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "memory", as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR-RAM). The memory can also include a disk. The memory can store an operating system that controls or allocates resources of a computing device. The memory can also store data for use by the processor.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system and/or program that controls or allocates resources of a computing device.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical non-transitory signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or "comparing" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments described herein include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. The embodiments can also be in a computer program product which can be executed on a computing system.

The embodiments also relates to an apparatus for performing the operations herein. This apparatus can be specially constructed for the purposes, e.g., a specific computer, or it can comprise a general-purpose computer selectively activated or reconfigured by a computer program stored in the computer. Such a computer program can be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each electrically connected to a computer system bus. Furthermore, the computers referred to in the specification can include a single processor or can be architectures employing multiple processor designs for increased computing capability.

The algorithms and displays presented herein are not inherently related to any particular computer or other apparatus. Various general-purpose systems can also be used with programs in accordance with the teachings herein, or it can prove convenient to construct more specialized apparatus to perform the method steps. The structure for a variety of these systems will appear from the description below. In addition, the embodiments are not described with reference to any particular programming language. It will be appreciated that a variety of programming languages can be used to implement the teachings of the embodiments as described herein, and any references below to specific languages are provided for disclosure of enablement and best mode of the embodiments.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

The principles of the present disclosure have general application to air-operated pumps for moving a process liquid, and particular application to a leak detection and containment assembly, such as for use as a component of an air-operated pump assembly. As used herein, process liquid may refer to a liquid, slurry, gelatinous substance, suspension, etc., examples of which may include paints, stains, gasoline, strong acids, strong bases, food pastes such as tomato paste, etc.

These pumps are driven by a gas, such as compressed air. Motion of the motive air through driving chambers of an air-operated pump causes the pump to then move a process liquid through the pump. Typical air driven pumps are utilized continuously for long periods, often for many millions of cycles, and can include numerous moving parts. Reliable and continuous transfer of the process liquid can be critical to the industrial or other processes in which the process liquids are used. A leak of air or process liquid between an air side of a pump diaphragm and a process liquid side of the pump diaphragm, which sides are intended to remain separated during use of the pump, can cause significant contamination and/or spill issues. This unwanted occurrence can result in lost process liquid, extended downtimes, and expensive cleanup procedures, among other disadvantages.

Figure 1A:
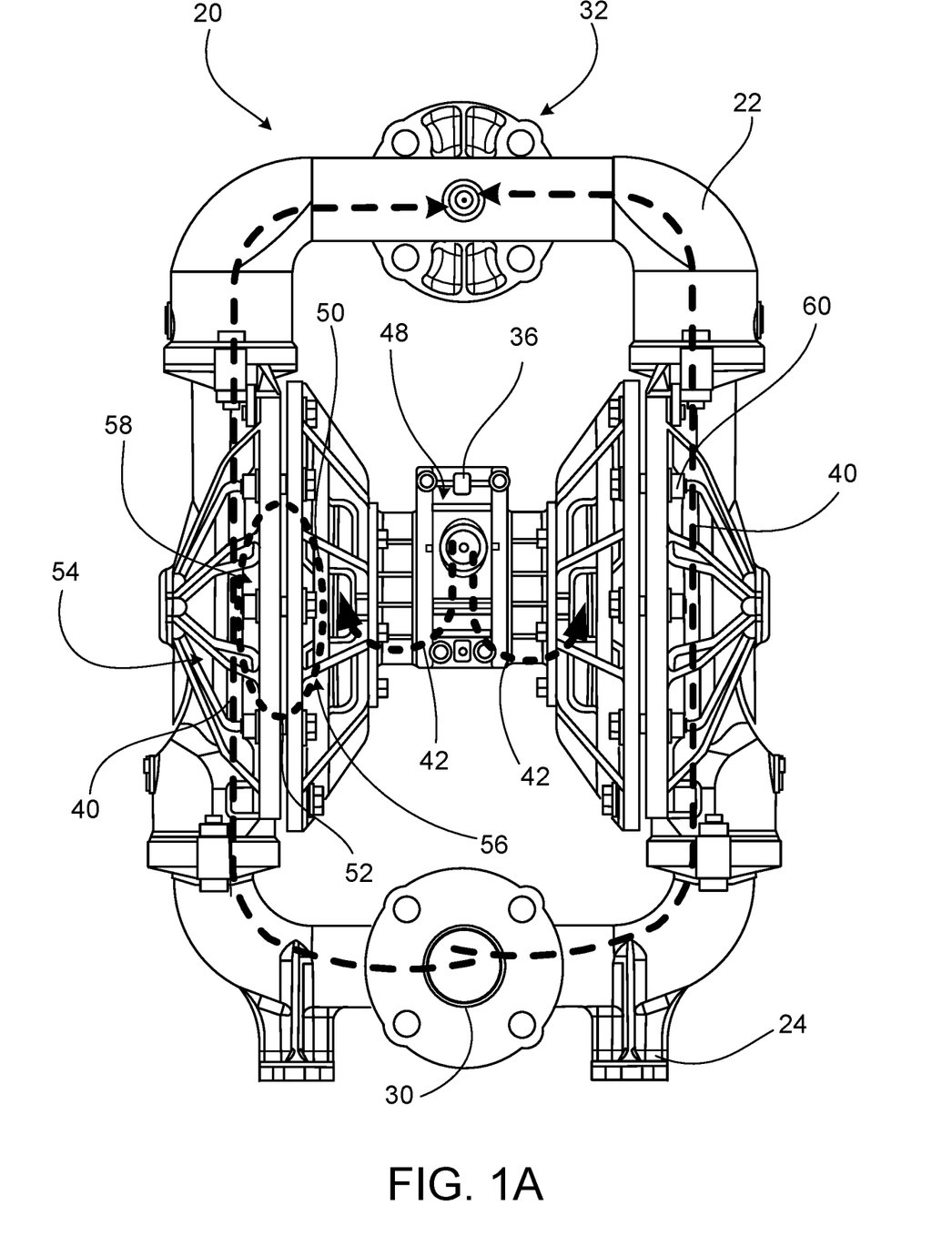
FIG. 1a is a front view of the air-operated pump according to the present disclosure; the view includes a partially removed section schematically illustrating internal components.
Figure 1B:
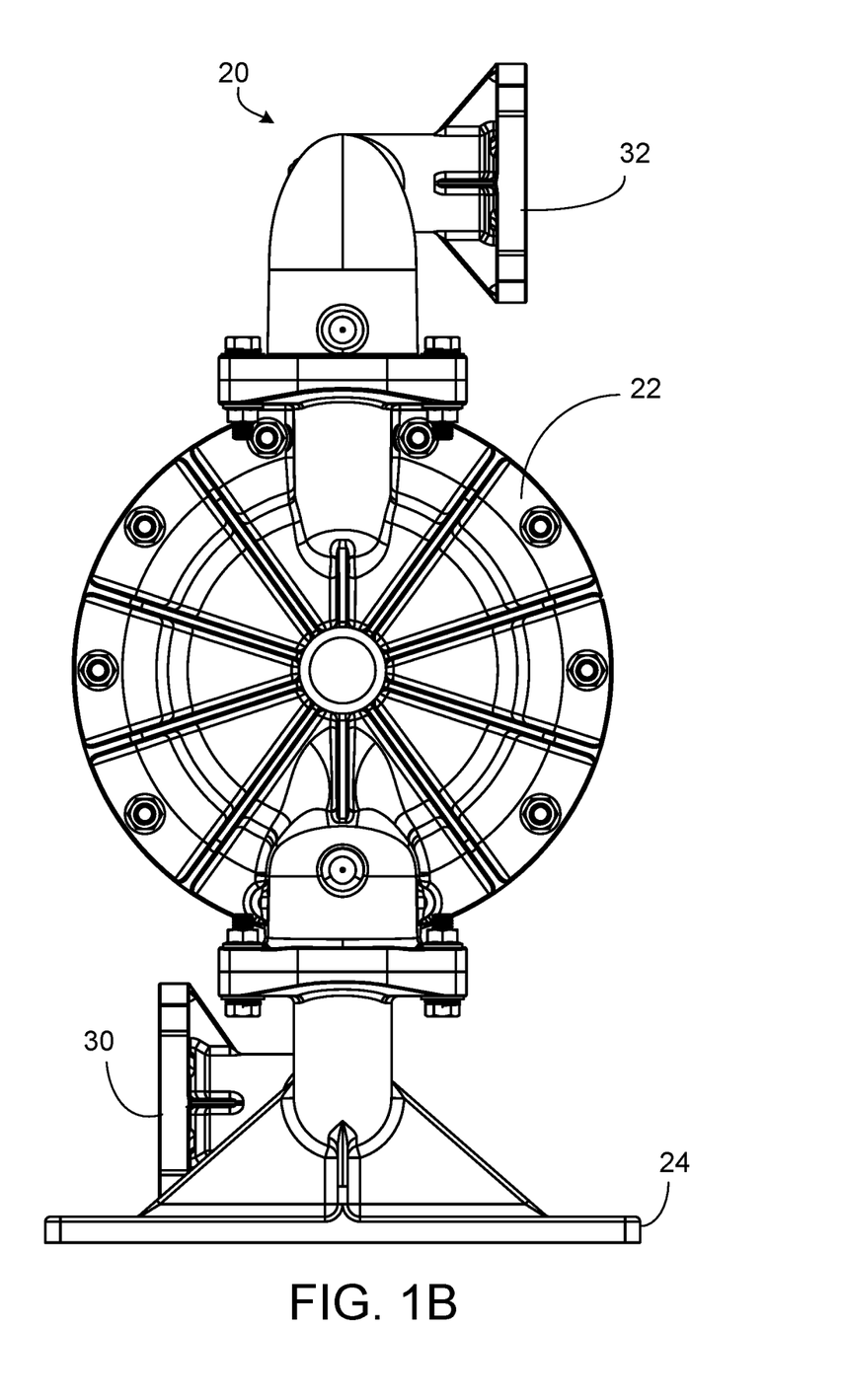
Figure 2:
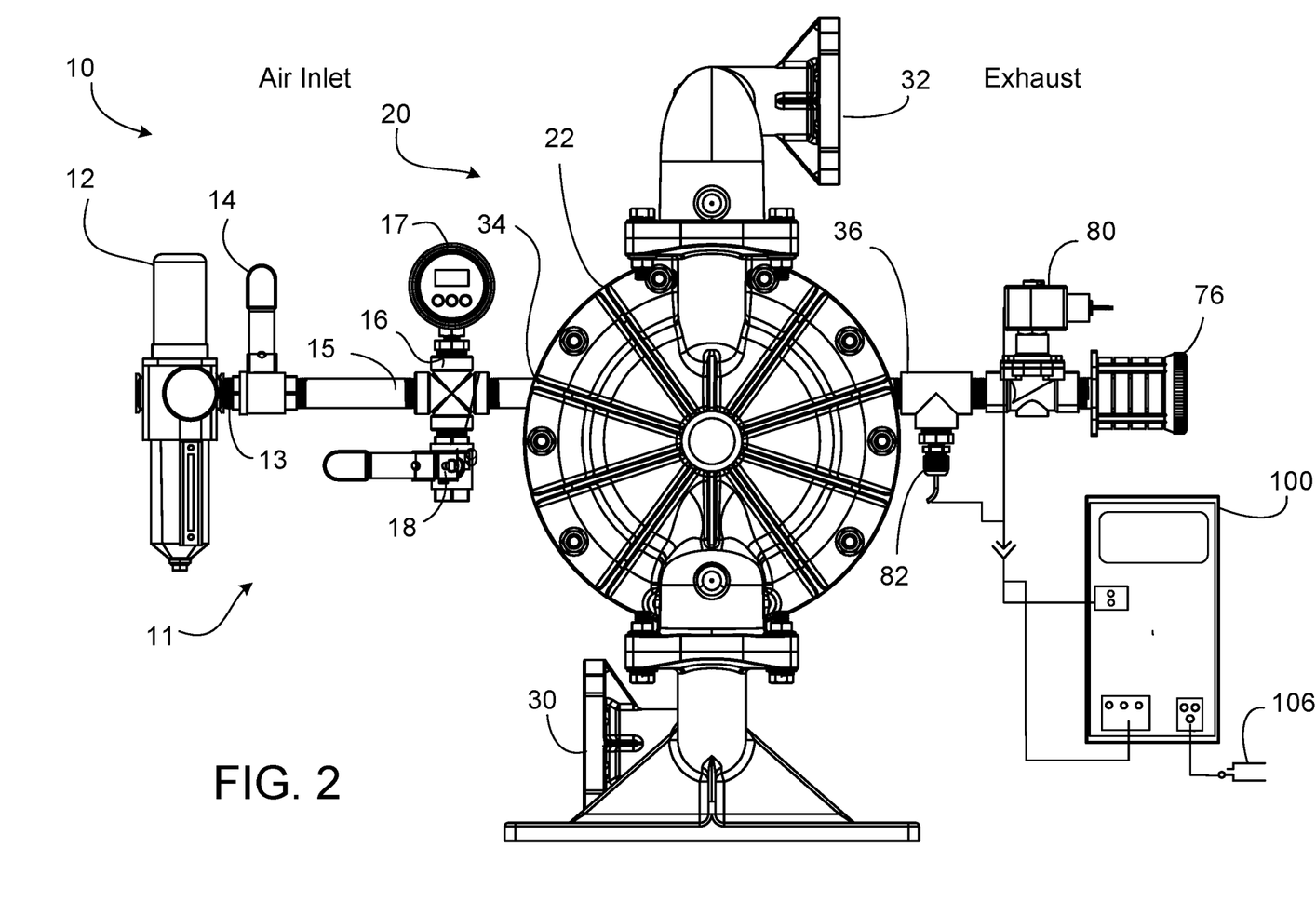
FIG. 2 is a side view of an air-operated pump system having the pump of FIGS. 1a-b and a leak detection and containment assembly.
Figure 3:
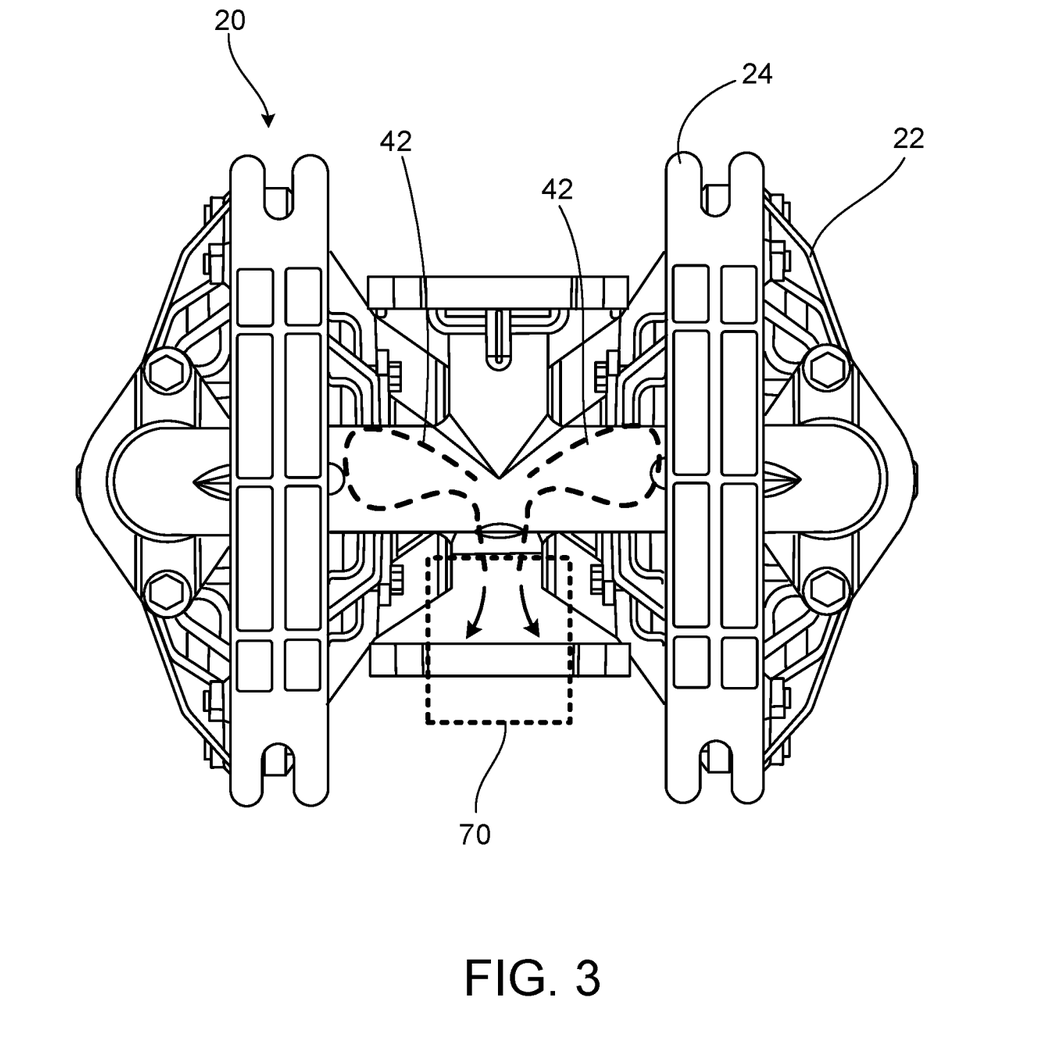
FIG. 3 is a partially-schematic bottom view of the air-driven pump of FIGS. 1a-b, showing a leak detection and containment assembly schematically of FIG. 2.

Turning first to FIGS. 1-3, an air-operated pump system 10 is shown, comprising an air-operated pump 20 with a leak detection and containment muffler assembly 70. Air-operated pumps 20 generally include an air pathway separated from and provided for moving/pumping a process liquid along a process liquid pathway through the pump. The pump 20 includes a pump body 22, which may be made of any suitable metal, polymer, combination thereof, etc., such as a chemically-resistant material. The pump body 22 includes base members 24 that may be secured to a surface for supporting the pump 20 during its use.

The depicted pump body 22 includes a process liquid inlet 30, a process liquid outlet 32, an air inlet 34 and an air outlet 36. The air outlet 36 is sometimes also known as an exhaust.

A process liquid pathway 40 is defined at least in part by the pump body 22 and extends at least from the process liquid inlet 30 through the process liquid outlet 32. An air pathway 42 is defined at least in part by the pump body 22 and extends at least from the air inlet 34 to the air outlet 36. The air pathways 42 are illustrated in part in FIG. 1*a* and continues at FIG. 3.

Generally, with reference to the depicted air-operated pump 20, air passing into the air inlet 34 and to the air outlet 36 to be exhausted form the pump 20 provides a motive force for moving a process liquid through the pump 20.

Air is received into air inlet 34 through the air intake system 11. The air intake system 11 is comprised of a filter/regulator 12, an air supply on/off valve 14, a union 16, a pressure gauge 17, and a pressure release valve 18. Motive air is received into the filter/regulator 12, where the air is filtered and the pressure is adjusted to the user specifications. The motive air can be shop air and is generally provided by an air compressor that is connectable to the filter/regulator 12. Downstream from the filter/regulator 12 is the air supply on/off valve 14, which is threadably connected to the filter regulator 12 via a filter/regulator coupler 13. In an embodiment, the air supply on/off valve 14 may be manually changed between the on and off positions. In other embodiments, the air supply on/off valve 14 may also be automated and/or electronically controllable, such as through controller 100. Downstream from the air supply on/off valve 14 is a union 16. The air supply on/off valve and union 16 are threadably coupled via a union coupler 15. Also threadably connected to the union 16 is a pressure gauge 17 and a pressure release valve 18. The union is threadably coupled to the air inlet 34 via an air inlet coupler 19.

In an embodiment, motive air is received at the filter/regulator 12 travels through the air supply on/off valve 14 through the filter/regulator coupler 13. The motive air is then received at the union 16 from the air supply on/off valve 14 through the union coupler 15. The union 16 also have a pressure gauge 17 for monitoring the pressure within the air intake system 11 and received by the air inlet 34. Further, the union 16 also has a pressure release valve 18 for releasing pressure from within the air intake system 11 and at the air inlet 34. The motive air is then received at the air inlet 34 from the union 16 through the air inlet coupler 19.

The motive air received at air inlet 34 is passed through a series of chambers (not specifically shown) in the pump body 22 to drive movement of a valve 48 (location generally shown) connected to a central rod 50. Movement of the valve 48 causes movement of at least one moveable member 52, such as a diaphragm, that is coupled to the central rod 50.

In pump 20, diaphragms 52 may be used. In an embodiment of pump 20 shown, a pair of vertically spaced apart diaphragms 52 may be used, located in air sides 56 of respective diaphragm chambers 54 of the pump body 22. Accordingly, the pump 20 may also include a pair of air pathways 42 and a pair of process liquid pathways 40, which alternate in operation as will be explained further.

In other embodiments, the diaphragms 52 may be otherwise located, and/or any suitable number of diaphragms 52 may be used. Additionally or alternatively, the pump 20 may have an alternative construction that may include fewer or additional portions of each of the air pathway 42 and the process liquid pathway 40.

Although pump 20 is depicted as an air-operated diaphragm pump, it is contemplated that pump 20 can be any type of air assisted (pneumatic) pump having a failure mode where process liquid can exit the process liquid pathway 40 and enter the air pathway 42. Stated alternatively, air-operated pump 20 can be any type of pump having a process liquid pathway 40 and air pathway 42 that are fluidly separated from one another within the pump body 22; wherein air passing along the air pathway 42 causes pumping of the process liquid along the process liquid pathway 40.

In an air-operated diaphragm pump, when air pressure is applied to the pump 20 via the air pathway 42 the valve 48 moves up and down, causing air pressure to divert to an air side 56 of the respective diaphragm chamber 54. Due to the movement of the valve 48, as air is diverted to one diaphragm chamber 54, air in the opposite chamber 54 is exhausted out of the air outlet 36. This motive air process constantly alternates between the diaphragm chambers 54 (and specifically between the air sides 56 of the chambers 54) to create a continuous cycle. The motive/driving air typically is exhausted into the environment in the use of air-operated pumps.

Movement of the diaphragms 52 within the chambers 54 causes pumping of the process liquid in a similar manner. One diaphragm 52 creates suction into a process liquid side 58 of a respective diaphragm chamber 54, drawing process liquid from the process liquid inlet 30. The other diaphragm 52 expels process liquid from the opposite and respective diaphragm chamber 54 to the process liquid outlet 32. This process cycles and continues concurrently with movement of the motive air, thus pumping process liquid.

In addition to pumping, the diaphragms 52 also serve as barriers between the air side/air pathway 42 and process liquid side/process liquid pathway 40 of the pump body 22. Often, strokes are continuously counted and diaphragms 52 and other seals replaced, such as on a schedule, due to wear of the diaphragms 52 and other seals.

Even in view of such a maintenance/changeover schedule, a leak may occur between the air pathway 42 and process liquid pathway 40 of the pump 20. The leak may be caused by a worn or blow seal or diaphragm 52, tension or stress in the pump body 22 such as related to installation, and/or improperly tightened fasteners 60 coupling together portions of the pump body 22, such as portions defining the diaphragm chambers 54.

Regardless of the root cause, process liquid may begin to leak into the air pathway 42. Absent a preventive measure, the leaked process liquid will be pumped out of the air outlet 36 with the exhaust air and into the environment disposed about the pump 20. The spill/leak can cause costly and extensive cleanup operations, costly downtimes for pumping, and/or loss of process liquid, none of which is ideal. Further, a leak of the process liquid may also pose a danger to workers in the spill/lead area, such as when the process liquid is a hazardous chemical.

To remedy this concern, the pump 20 may include a leak detection and containment assembly 70, such as shown schematically at FIGS. 2-3. The leak detection and containment assembly 70, also herein referred to as a leak detection and containment muffler assembly 70 when including a muffler, is integrated with the pump body 22.

Figure 4:
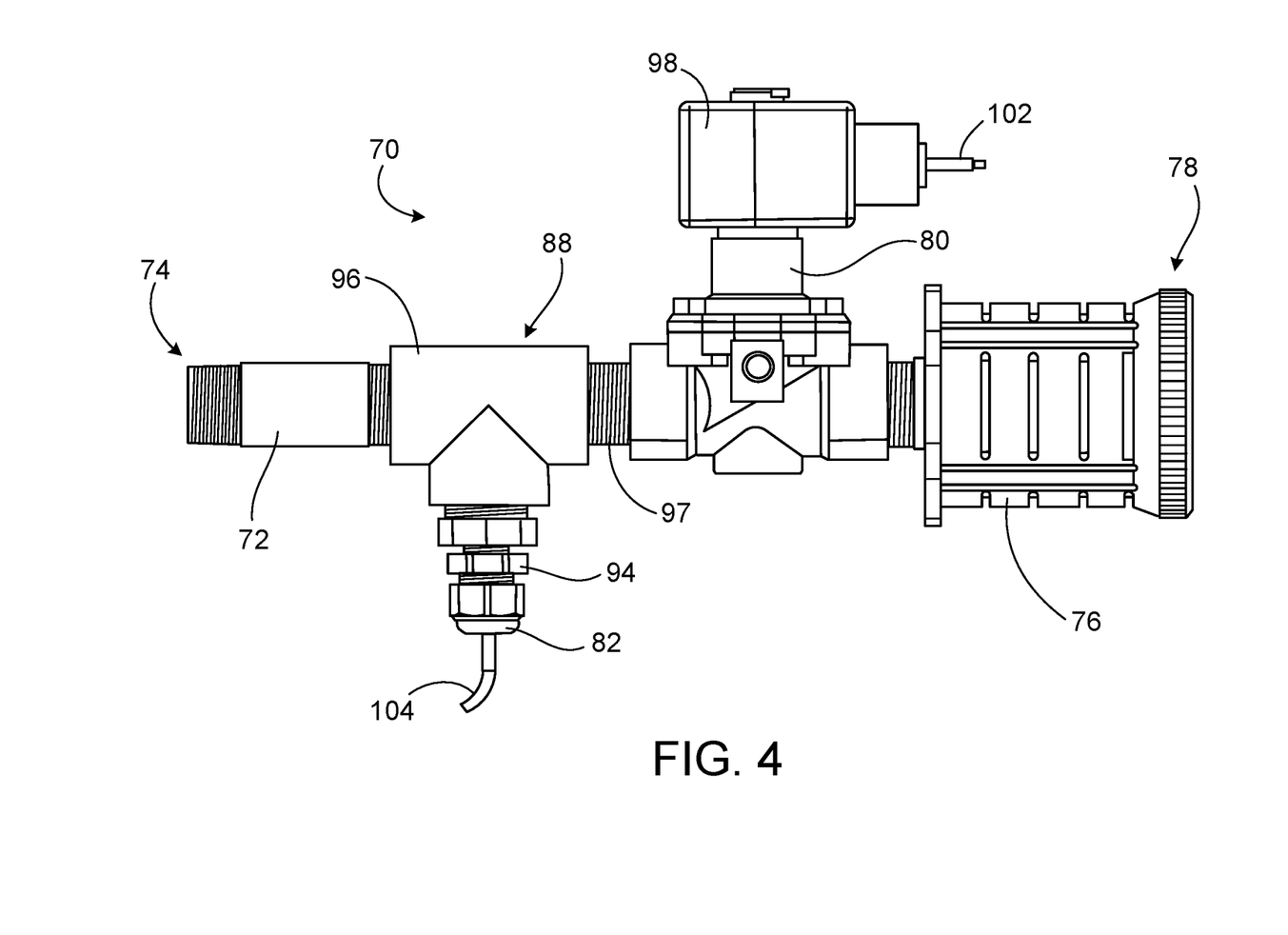
FIG. 4 is a side view of a leak detection and containment assembly of FIGS. 2 and 3 for use with the pump of FIGS. 1a-b.
Figure 5:
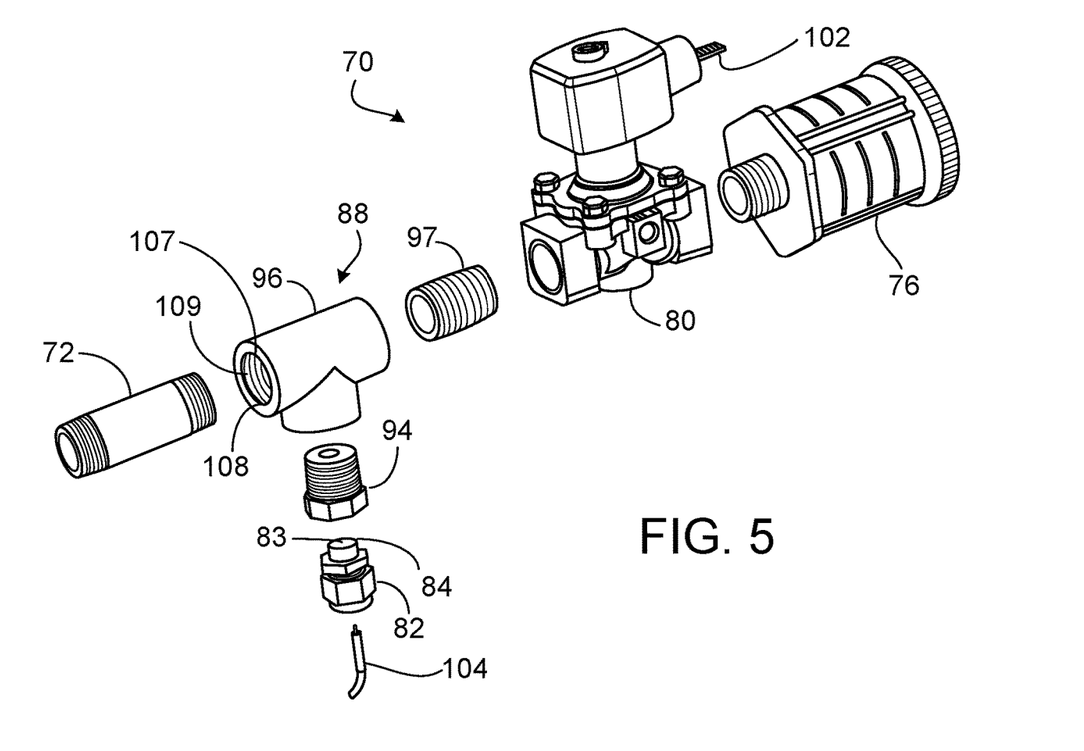
FIG. 5 is a perspective view of the leak detection and containment assembly of FIG. 4, shown in exploded form.

Turning to FIGS. 4 and 5, the leak detection and containment assembly 70 extends between a coupling element 72 at a proximal end 74 of the assembly and a muffler 76 at a distal end 78 of the assembly 70. Therebetween are disposed a shutoff valve 80 and a process liquid sensor 82. While each of the elements of the coupling element 72, muffler 76, shutoff valve 80, and process liquid sensor 82 are depicted as being coupled to one another via threads, other suitable methods may be used where suitable, such as adhesive, welding, etc., depending on materials used.

Aspects of the assembly may be composed of metal, polymer, chemical resistant materials, etc., where suitable.

Generally the assembly 70 defines a linear section of air pathway of the air-operated pump 20, when integrated with the body 22, to allow for ease of exhaust and detection of a leaked process liquid. For example, the assembly 70 at least provides a linear pathway between the coupling element 72 and muffler 76, and the illustrated assembly includes the process liquid sensor 82, muffler 76, and shutoff valve 80 oriented relative one another to define a linear pathway between the coupling element 72 and muffler 76. Where suitable, the pathway through the assembly 70 may be otherwise oriented.

Figure 6:
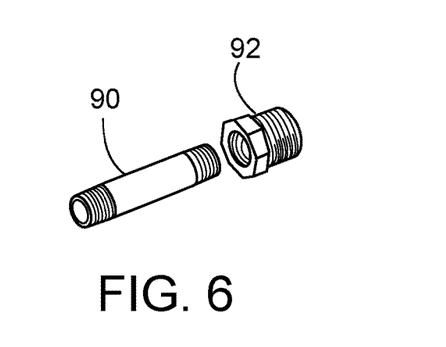
FIG. 6 is a perspective view of coupler elements for use in place of a coupler element of the assembly shown in FIGS. 4 and 5.

Integration with the pump body 22 may be by way of any suitable attachment, such as fasteners, threads, welding, etc. Preferably, the assembly 70 may be coupled to the pump body 22 via interlocking threads at each of the pump body 22 and assembly 70. Typical pump bodies 22 include threads at the exhaust or air outlet 36, such as for attachment of a muffler. The depicted assembly 70 includes the coupling element 72 having threads for coupling to the air outlet 36. Where the threads are inappropriately sized, reducing or enlarging components may be used, threaded to the proximal end 74 of the assembly 70 to allow for retrofit to previously existing or used pumps 20/pump bodies 22. For example, the depicted coupling element 72 may be replaced with the coupling elements 90 and 92 shown in FIG. 6 to allow for pipe size reduction at the proximal end 74.

Turning again to FIG. 5, opposite the coupling element 72 is disposed the muffler 76. The muffler 76 typically includes a noise abating material, element, or tortuous pathways to reduce the decibel level created by the motive air as it is exhausted from the pump 20/air pathway 42.

Disposed along the assembly 70 upstream of muffler 76 is the process liquid sensor 82. As used herein, the upstream direction refers to a direction opposite a downstream direction, and more particularly, taken from the distal end 78 towards the proximal end 74, opposite a normal direction of air flow along the air pathway 42. The downstream direction refers to a direction taken from the proximal end 74 towards the distal end 78 in the normal direction of air flow along the air pathway 42.

The process liquid sensor 82 is configured to sense process liquid having leaked from the process liquid pathway 40 into the air pathway 42. To provide for rapid sensing and reduced maintenance on the assembly 70, the process liquid sensor 82 may be a static sensor, such as a conductance or capacitance sensor, having all fixed components in response to air flow moving past the process liquid sensor 82. Thus, rather than requiring buildup of liquid within a reservoir, or to move a float mechanism, for instance, the process liquid sensor 82 may more rapidly identify an unintended contaminant within the air pathway 42.

Process liquid sensor 82 has a sensing element 83 having a tip 84. The sensing element 83 is the portion of process liquid sensor 82 that will result in a change of the output of process liquid sensor 82, when contacted with process liquid. Stated alternatively, a change in the output of process liquid sensor 82 occurs when process liquid comes into contact with sensing element 83.

Further, in some embodiments, the process liquid sensor 82 may be located out of the direct line of exhaust flow on the main air channel 108 of air pathway 42 of leak detection and containment assembly 70. In an embodiment, the main air channel 108 can be the most direct route for exhaust flow from the air outlet 36 to the distal end 78. Stated alternatively, the main air channel 108 can be the most direct route for exhaust flow from the air outlet 36 to the muffler 76. Additionally, in some embodiments, the process liquid sensor 82 may also be located at the low point of the leak detection and containment assembly 70. In some embodiments, the process liquid sensor 82 may be located at the lowest point of the air pathway 42 downstream from the air outlet 36. In some embodiments, the tip 84 of the sensing element 83 of the process liquid sensor 82 may be located below a bottom 107 of the main air channel 108. In another embodiment, the tip 84 of the process liquid sensor 82 can be located between about 0.5 inches and 2 inches below the bottom 107 of the main air channel 108. In a further embodiment, the tip 84 of the process liquid sensor 82 can be located between about 1 inch and 2 inches below the bottom 107 of the main air channel 108.

The tip 84 is the portion of the sensing element 83 of the process liquid sensor 82 that is located the closest to bottom 107 of the main air channel 108. Depending on the geometry of the sensing element 83, the tip 84 can range from a small portion of the sensing element 83 to the entirety of sensing element 83. In an embodiment, the bottom 107 of the main air channel 108 may be defined as the lowest point of the inner diameter 109 of the main air channel 108. In another embodiment, the bottom 107 of the main air channel 108 may be defined as the lowest point of the inner diameter 109 of the T-element 96 on the main air channel 108. In an embodiment, the tip 84 of the process liquid sensor 82 can be located about two inches below the bottom 107 of the main air channel 108. In an embodiment, the tip 84 of the process liquid sensor 82 can be located less than about four inches below the bottom 107 of the main air channel 108.

The position of the process liquid sensor 82 below the direct line of exhaust flow on the main air channel 108 mitigates false positives indicating a process liquid leak, such as due to an increase in the moisture content of the air travelling through air pathway 42. Thus, when shop air is used to power pump 20, the moisture in the shop air will pass through air pathway 42 and pass over the sensor 82 without contacting the sensing element 83, thereby mitigating the occurrence of false positives for process liquid leaks. However, process liquid that travels past a failed diaphragm 52 will still contact the sensing element 83 and be accurately sensed by process liquid sensor 82.

The process liquid sensor 82 may be chosen or configured to specifically sense the particular process liquid being pumped, such as conductive liquid or non-conductive liquid. For example, aspects of the sensor may be adjusted, including, but not limited to sensitivity, power level, etc.

The process liquid sensor 82 is depicted as a conductance or capacitance sensor for detecting a change in conductance or capacitance in the flow along the air pathway 42, such as a conductive liquid sensor. Further, process liquid sensor 82 may be a non-conductive liquid sensor, such as, but not limited to, photoelectric level sensor type VP, unmodulated VP03EP, manufactured by Carlo Gavazzi Automation of Lainate, Italy, also known as a dome sensor or optical liquid sensor. A dome sensor work on the principle of total internal reflection, where an LED and photo-transistor are housed in a head (tip) of the dome. When no liquid is present, light from the LED is reflected internally from the dome to the photo-transistor. When liquid is covering the dome, the effective refractive index at the dome-liquid boundary changes, allowing some light from the LED to escape. Thus the amount of light received by the photo-transistor is reduced and the output switches, indicating the presence of liquid.

In some embodiments, the non-conductive liquid sensor can be used to sense both non-conductive liquids, as well as conductive liquids. In some embodiments, the process liquid sensor 82 may include two or more cooperating sensors which act as process liquid sensor 82. In some embodiments, the process liquid sensor 82 may include an infrared sensor, moisture sensor, conductive liquid sensor, non-conductive liquid sensor, or other suitable sensor for detecting presence of process liquid in the air pathway 42 downstream of the air outlet 36. In an embodiment, the process liquid sensor 82 may be configured to sense liquid having a conductivity of at least that of Dasani® bottled water, such as about 52.3 $\mu\Omega/cm^2$.

Positioning of the assembly 70 along the air pathway 42 downstream of the body 22 permits the air exhaust to propel any leaked process liquid downstream from the body 22 and onto the process liquid sensor 82, when the shutoff valve 80 is open, thereby helping to detect a leak faster. To achieve sensing of the air pathway 42, the process liquid sensor 82 is positioned downstream of the air outlet 36, when the assembly 70 is integrated with the pump body 22.

As depicted, the process liquid sensor 82 is disposed along the assembly 70 between the coupling element 72 and the shutoff valve 80. In some embodiments, shutoff valve 80 may be a solenoid valve. Positioning of the process liquid sensor 82 upstream of the shutoff valve 80 may allow for containment of a majority, or even all, of the process liquid leaked into the assembly 70, such as where the process liquid sensor 82 rapidly detects the process liquid and allows for closing of the shutoff valve 80. The process liquid sensor 82 also is disposed along the air pathway 42 or assembly 70 spaced from the muffler 76, which can reduce the impact of muffler icing causing a negative contaminant reading on the process liquid sensor 82.

The process liquid sensor 82 is removably coupled, such as threaded, to the remainder of the assembly 70, such as to allow for maintenance or cleaning of the process liquid sensor 82. As depicted, the process liquid sensor 82 is a component of a process liquid sensor subassembly 88 disposed along the body of the assembly 70. The depicted process liquid sensor subassembly 88 includes the process liquid sensor 82, a bushing 94, and a T-element 96. The process liquid sensor 82 is coupled to the bushing 94, which is coupled to the T-element 96, where the T-element 96 is coupled in line with the coupling element 72 and shutoff valve 80 along the assembly 70. In other embodiments, another suitable arrangement of components may be used, the bushing 94 may be omitted where suitable, and/or any of the components of the process liquid sensor subassembly 88 may be integral with one another. Further, in some embodiments, T-element 96 and coupler 97 may be replaced with a bung on coupling element 72, whereby the T-element 96 may be formed by the bung on coupling element 72.

The shutoff valve 80 is disposed along the assembly 70 between the muffler 76 and the process liquid sensor 82. The depicted shutoff valve 80 is shown as being threadedly coupled to the T-element 96 via a coupler 97. The threading allows for maintenance and cleaning of various components/aspects of the leak detection and containment assembly 70.

In some embodiments, another suitable connection may be used and/or any of the shutoff valve 80, muffler 76 and process liquid sensor subassembly 88 may be permanently coupled or integral with one another along the assembly 70. In some embodiments, the process liquid sensor 82 instead may be disposed between the muffler 76 and the shutoff valve 80, where suitable.

The shutoff valve 80 is communicatively coupled to the process liquid sensor 82 and is configured to close in response to the process liquid sensor 82 sensing a process liquid or contaminant, to thereby contain the leaked process liquid or contaminant within the pump body 22 and the assembly 70. The shutoff valve 80 is illustrated as a motor-rotated ball valve, including a motor 98. Another type of shutoff valve may be used in other embodiments, such as a solenoid-activated knife-valve.

Figure 7:
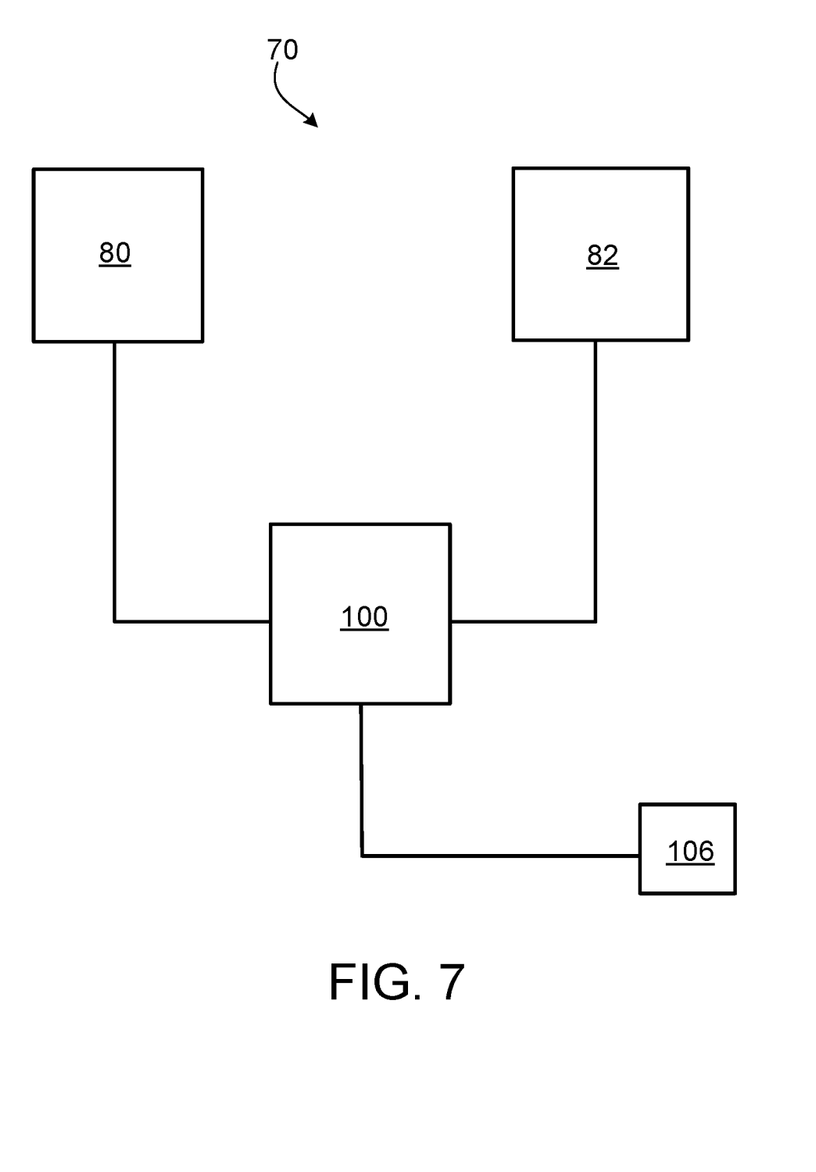
FIG. 7 is a schematic diagram of a portion of the leak detection and containment assembly of FIG. 4.

Referring now to FIGS. 2 and 7, the assembly 70 further includes a controller 100 communicatively coupling the shutoff valve 80 and the process liquid sensor 82. The controller 100 has a power supply 106. The controller 100 is generally configured to trigger the shutoff valve 80 upon the detection of process liquid by the process liquid sensor 82. In some embodiments, the controller 100 may be integrated with either of the process liquid sensor subassembly 88 or the shutoff valve 80. In some embodiments, the controller may be omitted and each of the shutoff valve 80 and process liquid sensor 82 may communicate directly with one another or with an external controller, to allow for triggering of the shutoff valve 80.

As shown at least partially in FIGS. 2, 4-5 and 7, each of the shutoff valve 80 and the process liquid sensor 82 include wiring 102 and 104, respectively, extending therefrom for communicating with the controller 100, thus communicatively coupling the shutoff valve 80 and the process liquid sensor 82. In other embodiments, communication between any of the shutoff valve 80, the process liquid sensor 82 and the controller 100 may be wireless or wired, and signals may be sent such as by way of LAN, WAN, Bluetooth®, Zigbee®, cellular, token ring, WiFi, etc.

Inclusion of the controller 100 allows for adjustment of the response between the process liquid sensor 82 and the shutoff valve 80. For example, sensitivity or power setting of the process liquid sensor may be adjusted according to the process liquid and composition of the compressed air used.

The controller 100 may include one or more processors, storage, or memory for controlling the process liquid sensor 82 and the shutoff valve 80. Accordingly, aspects described in the present disclosure may be embodied in any one or more of a system including hardware and/or software, software apart from hardware, or a method.

Each of the process liquid sensor 82 and the shutoff valve 80 may be powered by the power supply 106 coupled to the controller 100, or may be separately powered by any suitable source.

In use, when the process liquid sensor 82 senses a fluid (process liquid), a signal is sent directly or indirectly to the shutoff valve 80, triggering closing of the shutoff valve 80. This closing of the shutoff valve 80 stops the flow of compressed air out of pump 20, thereby preventing the pump 20 from operating and preventing process liquid from escaping out of containment assembly 70, such as through the muffler 76. In some embodiments, the process liquid sensor 82 also may be communicatively connected to an air compressor, which produces the compressed air depicted as driving pump 20. In this way, the supply of compressed air to pump 20 may be shutdown such as to prevent buildup of pressure in the pump 20 that will not be exhausted. In other embodiments, the pump 20 may be configured to shutdown in response to sensing of failed exhausting of the compressed air.

Use of the leak detection and containment assembly 70 in conjunction with the pump body 22 allows for containment of process liquid in the unwanted scenario of a leak between the compressed air and process liquid sides of the pump body 22. The assembly 70 according to the disclosure allows for retrofit to existing units. Other benefits include reduction of effect of icing of the muffler 76 in view of spacing of the process liquid sensor 82 from the muffler 76 and also rapid sensing in view of lack of requirement for buildup of liquid within a reservoir, or to move a float mechanism, which also may ice and require additional maintenance.

In summary, an air-operated pump 20 includes a pump body 22, a process liquid pathway 40 defined at least in part by the pump body 22, and an air pathway 42 defined at least in part by the pump body 22, wherein the process liquid pathway 40 and air pathway 42 are separated from one another within the pump body 22 by diaphragm 52. The pump 20 further includes a leak detection and containment assembly 70 integrated with the pump body 22 and having a process liquid sensor 82 configured to sense process liquid leaked from the process liquid pathway 40 into the air pathway 42, and a shutoff valve 80 communicatively coupled to the process liquid sensor 82 and configured to close in response to the process liquid sensor 82 sensing a process liquid leak to contain the leaked process liquid within the pump body 22 and the assembly 70. The leak detection and containment assembly 70 is disposed along the air pathway 42 permitting air exhaust from the body 22 to and flow through the shutoff valve 80 when open prior to exiting at the muffler 76.

Figure 8:
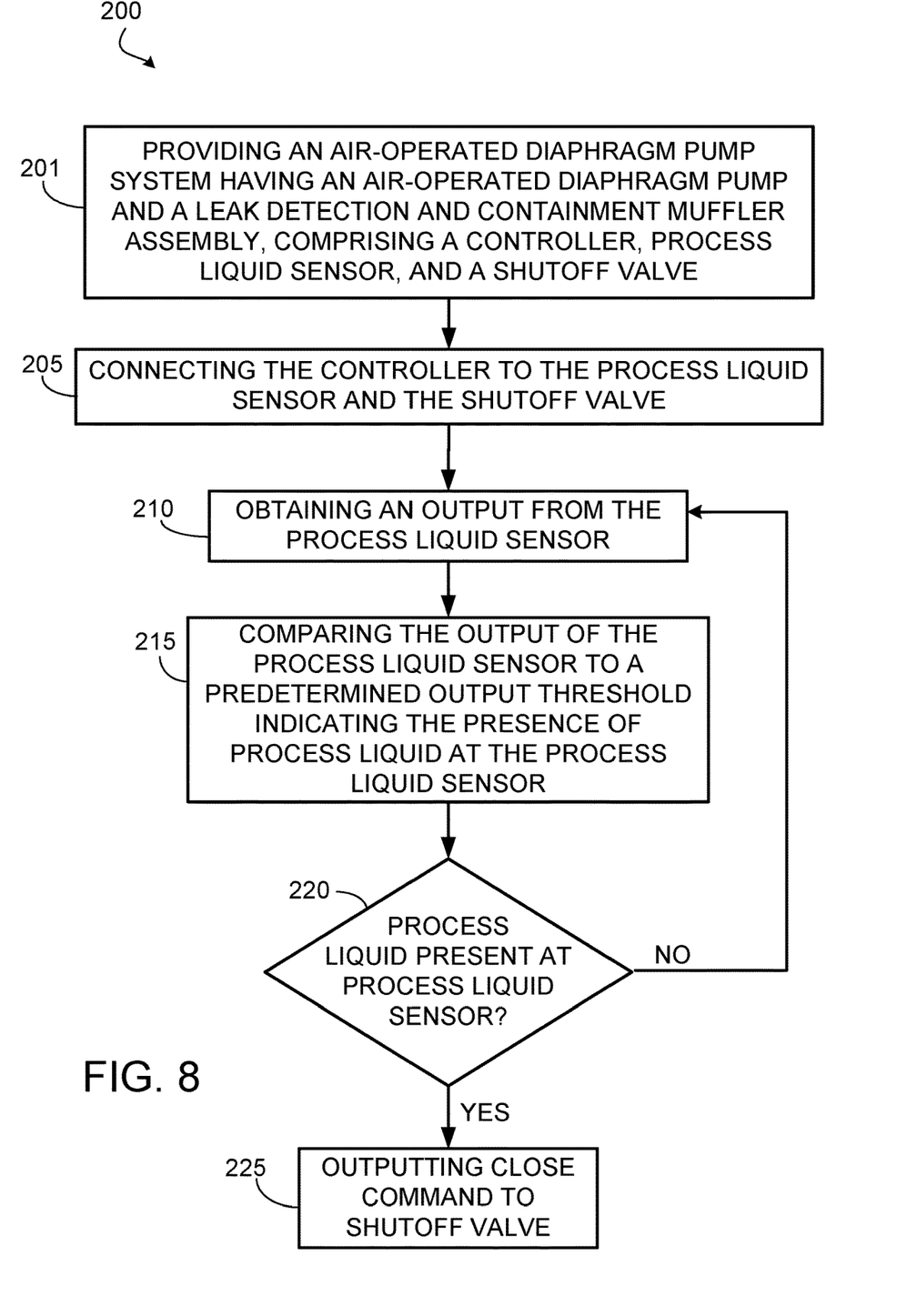
FIG. 8 is a flowchart illustration of a method of operating an air-operated pump system of FIGS. 2-7.

FIG. 8 is a flowchart illustrating a method 200 of operating an air-operated diagraph pump system with a leak detection and containment muffler assembly 10. In block 201, an air operated pump system 10 with an air-operated pump 20 and a leak detection and containment muffler assembly 70 comprising a controller 100, process liquid sensor 82, and a shutoff valve 80 are provided.

In block 205, the controller 100 is connected to the process liquid sensor 82 and the shutoff valve 80. In block 210, an output from the process liquid sensor 82 is obtained by the controller 100. In block 215, the controller compares the output obtained from the process liquid sensor 82 to a predetermined output threshold indicating the presence of process liquid at the process liquid sensor 82.

In an embodiment, the predetermined threshold can be a predetermined conductivity value and the output of the process liquid sensor 82 can be the conductivity value measured at the sensing element 83 of the conductivity sensor. The presence of process liquid may be indicated at the process liquid sensor 82, when the conductivity value measured at the sensing element 83 is greater than the predetermined conductivity value.

In another embodiment, the predetermined threshold can be a predetermined voltage and the output of the process liquid sensor 82 can be a voltage that changes based on the presence of process liquid at the sensing element 83. In an embodiment where the voltage output of the process liquid sensor 82 decreases, when process liquid is present at the sensing element 83; the presence of process liquid at the process liquid sensor 82 may be indicated, when the voltage output of the process liquid sensor 82 is lower than the predetermined voltage. Stated alternatively, the detection of process liquid by the process liquid sensor 82 may be indicated, when the voltage output of the process liquid sensor 82 is lower than the predetermined voltage.

Further, in an embodiment where the voltage output of the process liquid sensor 82 increases, when process liquid is present at the sensing element 83; the presence of process liquid at the process liquid sensor 82 may be indicated, when the voltage output of the process liquid sensor 82 is greater than the predetermined voltage. Stated alternatively, the detection of process liquid by the process liquid sensor 82 may be indicated, when the voltage output of the process liquid sensor 82 is higher than the predetermined voltage.

In block 220, the method proceeds to block 225, when the comparison by the controller 100 indicates that process liquid is present at the process liquid sensor 82. Otherwise, the method proceeds to block 210, when the comparison by the controller 100 does not indicate the presence of process liquid at the process liquid sensor 82.

In block 225, the controller 100 closes the shutoff valve 80 by sending a close command to the shutoff valve 80, thereby shutting down pump 20 and preventing process liquid from escaping from air pathway 42, such as through the muffler 76.

Figure 9:
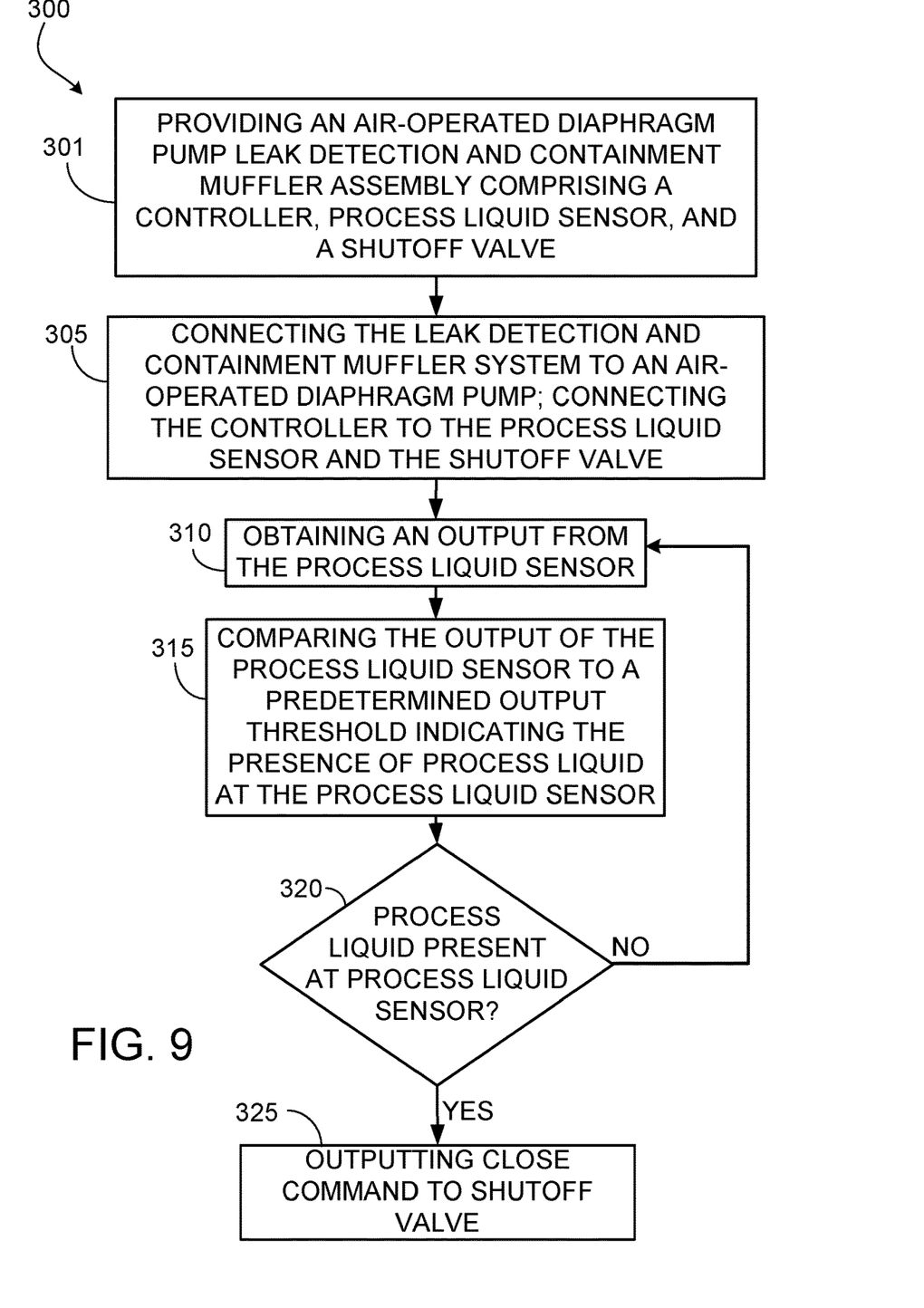
FIG. 9 is a flowchart illustration of a method of operating a leak detection and containment assembly of FIGS. 2-7.

FIG. 9 is a flowchart illustrating a method 300 of operating a leak detection and containment muffler assembly 70 for an air-operated pump 20. The leak detection and containment muffler assembly 10 comprising a controller 100, process liquid sensor 82 and shutoff valve 80. In block 301, a leak detection and containment muffler assembly 70 is provided and fitted to an air-operated pump 20. The leak detection and containment muffler assembly 70 comprises a controller 100, process liquid sensor 82, and a shutoff valve 80.

In block 305, the controller 100 is connected to the process liquid sensor 82 and the shutoff valve 80. In block 210, an output from the process liquid sensor 82 is obtained by the controller 100. In block 315, the controller compares the output obtained by from the process liquid sensor 82 to a predetermined output threshold indicating the presence of process liquid at the process liquid sensor 82.

In an embodiment, the predetermined threshold can be a predetermined conductivity value and the output of the process liquid sensor 82 can be the conductivity value measured at the sensing element 83 of the conductivity sensor. The presence of process liquid may be indicated at the process liquid sensor 82, when the conductivity value measured at the sensing element 83 is greater than the predetermined conductivity value.

In another embodiment, the predetermined threshold can be a predetermined voltage and the output of the process liquid sensor 82 can be a voltage that changes based on the presence of process liquid at the sensing element 83. In an embodiment where the voltage output of the process liquid sensor 82 decreases, when process liquid is present at the sensing element 83; the presence of process liquid at the process liquid sensor 82 may be indicated, when the voltage output of the process liquid sensor 82 is lower than the predetermined voltage. Stated alternatively, the detection of process liquid by the process liquid sensor 82 may be indicated, when the voltage output of the process liquid sensor 82 is lower than the predetermined voltage.

Further, in an embodiment where the voltage output of the process liquid sensor 82 increases, when process liquid is present at the sensing element 83; the presence of process liquid at the process liquid sensor 82 may be indicated, when the voltage output of the process liquid sensor 82 is greater than the predetermined voltage. Stated alternatively, the detection of process liquid by the process liquid sensor 82 may be indicated, when the voltage output of the process liquid sensor 82 is higher than the predetermined voltage.

In block 320, the method proceeds to block 325, when the comparison by the controller 100 indicates that process liquid is present at the process liquid sensor 82. Otherwise, the method proceeds to block 310, when the comparison by the controller 100 does not indicate the presence of process liquid at the process liquid sensor 82.

In block 325, the controller 100 closes the shutoff valve 80 by sending a close command to the shutoff valve 80, thereby shutting down pump 20 and preventing process liquid from escaping from air pathway 42, such as through the muffler 76.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention. Combinations of the above embodiments and other embodiments will be apparent to those of skill in the art upon studying the above description and are intended to be embraced therein. Therefore, the scope of the present invention is defined by the appended claims, and all devices, processes, and methods that come within the meaning of the claims, either literally or by equivalence, are intended to be embraced therein.

The invention claimed is:
1. An air-operated pump system comprising:
   an air-operated pump and a leak detection and containment assembly;

the air-operated pump comprising:
  a pump body;
  a process liquid pathway defined at least in part by the pump body;
  an air inlet coupled to the pump body;
  an air outlet coupled to the pump body and separate from the air inlet;
  a first air pathway defined at least in part by the pump body, the air inlet, and the air outlet, wherein the process liquid pathway and first air pathway are fluidly separated from one another within the pump body, and wherein air passing along the first air pathway causes pumping of a process liquid along the process liquid pathway; and
the leak detection and containment assembly extending from the air outlet and external to the pump body, the leak detection and containment assembly comprising a second air pathway extending from the air outlet through the leak detection and containment assembly, the leak detection and containment assembly comprising:
  a process liquid sensor positioned in the second air pathway downstream of the air outlet and configured to sense process liquid leaked from the process liquid pathway into the second air pathway;
  a shutoff valve disposed in the second air pathway and communicatively coupled to the process liquid sensor, the shutoff valve configured to close the second air pathway in response to the process liquid sensor detecting the process liquid, thereby containing the leaked process liquid within the pump body and the leak detection and containment assembly;
  the leak detection and containment assembly being disposed along the second air pathway and downstream from the air outlet of the pump body; and
  the process liquid sensor being located below a bottom of an air channel on the second air pathway, whereby the process liquid sensor is out of a direct line of exhaust flow on the air channel of the second air pathway.

2. The air-operated pump system of claim 1, wherein the process liquid sensor comprises a static sensor having components which are all fixed, wherein the static sensor works in response to air flow or process liquid moving past the static sensor.

3. The air-operated pump system of claim 1, wherein the leak detection and containment assembly further comprises a muffler disposed along the second air pathway.

4. The air-operated pump system of claim 3, wherein the process liquid sensor is spaced along the air second pathway upstream from the muffler.

5. The air-operated pump system of claim 1, wherein the leak detection and containment assembly defines a linear section of the second air pathway.

6. The air-operated pump system of claim 1, wherein the bottom of the air channel is a lowest point of an inner diameter of the air channel and a tip of the process liquid sensor is located about two inches below the bottom of the air channel.

7. The air-operated pump system of claim 1, wherein the air-operated pump is a diaphragm pump.

8. The air-operated pump of claim 1, further comprising a controller communicatively coupling the shutoff valve and the process liquid sensor, the controller configured to close the shutoff valve when the process liquid is present at the process liquid sensor.

9. An air-operated diaphragm pump comprising:
  a pump body having a process liquid inlet, a process liquid outlet, an air inlet and an air outlet separate from the air inlet;
  a process liquid pathway defined at least in part by the pump body and extending at least from the process liquid inlet through the process liquid outlet, and first air pathway defined at least in part by the pump body and extending at least from the air inlet through the air outlet;
  one or more diaphragm members disposed in said pump body and fluidly separating the process liquid pathway from the first air pathway in the pump body, the one or more diaphragm members configured for being driven by a supply of air directed along the first air pathway to cause movement of a process liquid along the process liquid pathway; and
  a leak detection and containment muffler assembly coupled to the air outlet external to the pump body and extending from the air outlet, the leak detection and containment muffler assembly defining a second air pathway from the air outlet, and the leak detection and containment muffler assembly comprising:
    a process liquid sensor downstream of the air outlet along the second air pathway, the process liquid sensor for detecting process liquid having leaked into the second air pathway, the process liquid sensor being located below a bottom of a air channel defining the second air pathway, whereby the process liquid sensor is out of a direct line of exhaust flow on the air channel of the second air pathway;
    a shutoff valve positioned in the second air pathway and communicatively coupled to the process liquid sensor, the shutoff valve configured to be closed, thereby isolating the second air pathway downstream of the shutoff valve upon detection of a process liquid leak into the second air pathway at the process liquid sensor; and
    a muffler for abating a noise level of air exhausted from the air outlet of the air-operated diaphragm pump.

10. The air-operated diaphragm pump of claim 9, wherein the shutoff valve is disposed downstream of the process liquid sensor along the second air pathway.

11. The air-operated diaphragm pump of claim 9, wherein the process liquid sensor comprises a static sensor having components which are all fixed, wherein the static sensor works in response to air flow or process liquid moving past the static sensor.

12. The air-operated diaphragm pump of claim 9, wherein the process liquid sensor is spaced upstream along the second air pathway from the muffler.

13. The air-operated diaphragm pump of claim 9, wherein the leak detection and containment muffler assembly defines a linear section of the second air pathway.

14. The air-operated diaphragm pump of claim 9, further including a controller communicatively connecting the shutoff valve and the process liquid sensor, the controller configured to trigger the shutoff valve upon recognition of process liquid leak by the process liquid sensor.

15. The air-operated diaphragm pump of claim 9, wherein the bottom of the air channel is a lowest point of an inner diameter of the air channel and a tip of the process liquid sensor is located two inches below the bottom of the air channel.

16. A leak detection and containment assembly to provide an air pathway for exhaust of motive air from an air outlet of an air-operated pump, the motive air for driving movement of a process liquid through the air-operated pump from an air inlet to the air outlet in another air pathway separate from the air pathway of the leak detection and containment assembly, the leak detection and containment assembly comprising:
- a coupling element configured to couple to the air outlet;
- a process liquid sensor positioned in the air pathway downstream of the coupling element and configured to sense process liquid leaked from the another air pathway into the air pathway;
- a muffler in fluid communication with the coupling element and the process liquid sensor; and
- a shutoff valve disposed in the air pathway and communicatively coupled to the process liquid sensor, the shutoff valve configured to be closed, thereby closing the air pathway of the leak detection and containment assembly downstream of the process liquid sensor between the coupling element and the muffler upon detection of a presence of the process liquid at the process liquid sensor.

17. The leak detection and containment assembly of claim 16, wherein the process liquid sensor comprises a static sensor having components which are all fixed, wherein the static sensor works in response to air flow moving past the static sensor.

18. The leak detection and containment assembly of claim 16, further comprising a controller communicatively coupling the shutoff valve and the process liquid sensor, the controller configured to trigger the shutoff valve upon detection of the process liquid at the process liquid sensor, and
  wherein the process liquid sensor is located below a bottom of a air channel on the air pathway, whereby the process liquid sensor is out of a direct line of exhaust flow on the air channel of the air pathway.

19. The leak detection and containment assembly of claim 18, wherein the bottom of the air channel is a lowest point of an inner diameter of the air channel and a tip of the process liquid sensor is located two inches below the bottom of the air channel.

20. The leak detection and containment assembly of claim 16, wherein the air outlet of the air-operated pump is separate from the air inlet of the air-operated pump.

* * * * *